B. BROWNSTEIN.
HAND PLOW.
APPLICATION FILED OCT. 11, 1915.
1,202,791.
Patented Oct. 31, 1916.
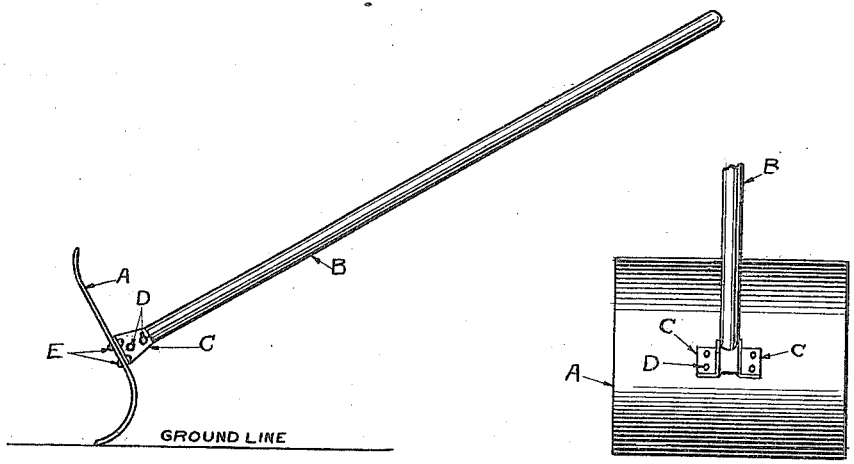
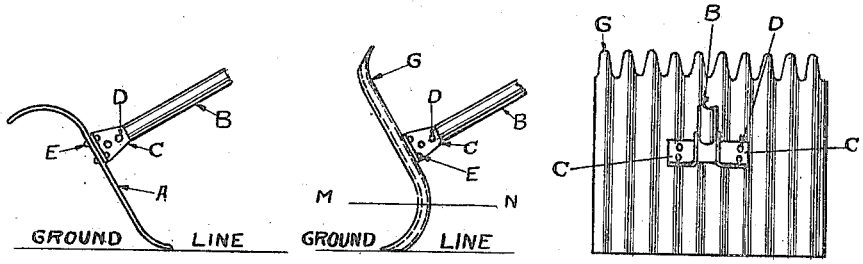
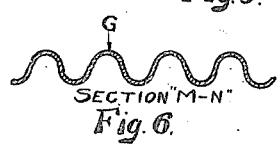
WITNESSES
INVENTOR
Benjamin Brownstein

UNITED STATES PATENT OFFICE.

BENJAMIN BROWNSTEIN, OF ELLWOOD CITY, PENNSYLVANIA.

HAND-PLOW.

1,202,791.

Specification of Letters Patent. Patented Oct. 31, 1916.

Application filed October 11, 1915. Serial No. 55,228.

*To all whom it may concern:*

Be it known that I, BENJAMIN BROWNSTEIN, a citizen of the United States, residing at Ellwood City, in the county of Lawrence and State of Pennsylvania, have invented new and useful Improvements in Hand-Plows, of which the following is a specification.

My invention relates to improvements in hand plows in that it can be used as a forward or backward plow and shovel for handling snow or other loose material, and perform the work required of it in a quick and efficient way. When cleaning snow from pavements and steps, it is the only tool that can alone perform the different operations required to do a clean job, and do it right.

The forward plow operation is used on straight paths that have no obstructions, and the backward plow and shovel operations are used in close quarters, such as corners, steps, etc.

The plow is simple in its construction, light in weight and the performance of its operations so simple, that a child can handle it and do good work with it.

The plow which produces the above results, is illustrated in the accompanying drawing, in which—

Figure 1, is a side view of the plow, the position is for forward movement, Fig. 2, a back view, and Fig. 3 a side view, indicating a backward movement, Fig. 4, is a side view of a plow made from corrugated sheeting, and Fig. 5, is a back view of plow shown in Fig. 4, Fig. 6, is an inlarged section on line "M—N" of corrugated plow.

Similar letters refer to similar parts throughout the several views.

The plow A, of Figs. 1, 2 and 3, is made of one piece plate bent to its proper shape and to which two bent clips C, are fastened by screws or rivets E, between the clips C, is inserted handle B, and fastened in its proper place by screws or rivets D.

The plow G, of Figs. 4, 5 and 6, is made of one piece, cut, corrugated and bent to its proper shape; this construction makes the plow far stronger than the plow shown in Figs. 1, 2 and 3, this produces teeth at top and bottom, which are capable of breaking up ice while in operation, hence, it is valuable for icy pavements, etc. The handle B, is fastened to plow G, in the same manner as shown in Figs. 1, 2 and 3.

I claim—

A plow made of one piece, corrugated lengthwise, having one end bent into a short arc in one direction, and the other end bent into a longer arc in the opposite direction, said bent ends being at right angles to length of corrugations, said ends having teeth produced by cutting the ends at an angle to their arcs of curvature, said bent ends making the plow into a letter S, and reversible in its operation, and an operating handle attached to said plow.

In testimony whereof I hereunto affix my signature in presence of two witnesses.

BENJAMIN BROWNSTEIN.

Witnesses:
M. J. KRAUS,
E. F. POOLE.

Copies of this patent may be obtained for five cents each, by addressing the "Commissioner of Patents, Washington, D. C."